United States Patent [19]
Olds et al.

[11] Patent Number: 5,596,315
[45] Date of Patent: Jan. 21, 1997

[54] MESSAGE UNIT FOR USE WITH MULTI-BEAM SATELLITE-BASED MESSAGING SYSTEM AND METHOD OF OPERATION THEREOF

[75] Inventors: Keith A. Olds; Gregory B. Vatt, both of Mesa, Ariz.; Christopher N. Kurby, Elmhurst, Ill.

[73] Assignee: Motorola, Inc., Schaumburg, Ill.

[21] Appl. No.: 317,084

[22] Filed: Oct. 3, 1994

[51] Int. Cl.⁶ .................................................. H01H 67/00
[52] U.S. Cl. ........................... 340/825.03; 340/825.44; 455/12.1; 379/59
[58] Field of Search ..................... 340/825.44, 825.49, 340/825.03; 455/12.1, 59, 38.3; 379/57–59; 370/94.1

[56] References Cited

U.S. PATENT DOCUMENTS

| | | | |
|---|---|---|---|
| 4,178,476 | 12/1979 | Frost | 379/59 |
| 4,713,808 | 12/1987 | Gaskill et al. | 340/825.44 |
| 4,845,491 | 7/1989 | Fascenda et al. | 340/825.44 |
| 4,860,003 | 8/1989 | De Luca et al. | 340/825.44 |
| 5,008,952 | 4/1991 | Davis | 455/12 |
| 5,161,248 | 11/1992 | Bertiger et al. | 455/12.1 |
| 5,257,019 | 10/1993 | Schwendeman et al. | 340/825.44 |

Primary Examiner—Michael Horabik
Assistant Examiner—Edward Merz
Attorney, Agent, or Firm—Harold C. McGurk, IV

[57] ABSTRACT

A satellite-based, world-wide cellular messaging system transmits paging messages to pagers via multiple beams. A message unit monitors multiple beams, recording the visit information for each beam, and ultimately determines the optimum beam to monitor for messages. The message unit, which conserves battery resources by entering into a sleep mode, synchronizes quickly to its message block when it awakes.

22 Claims, 13 Drawing Sheets

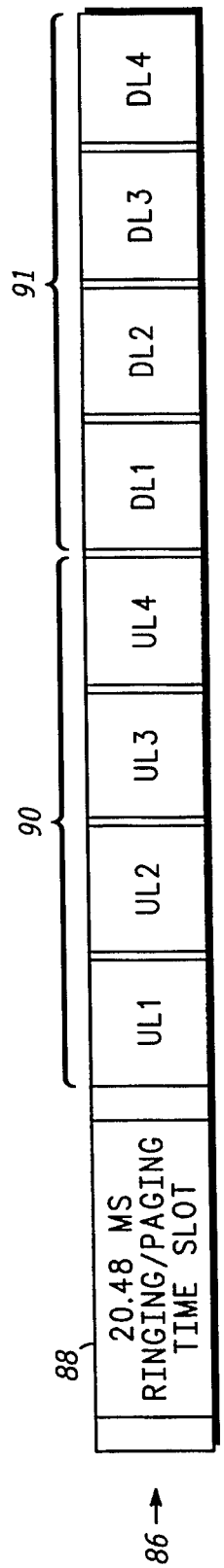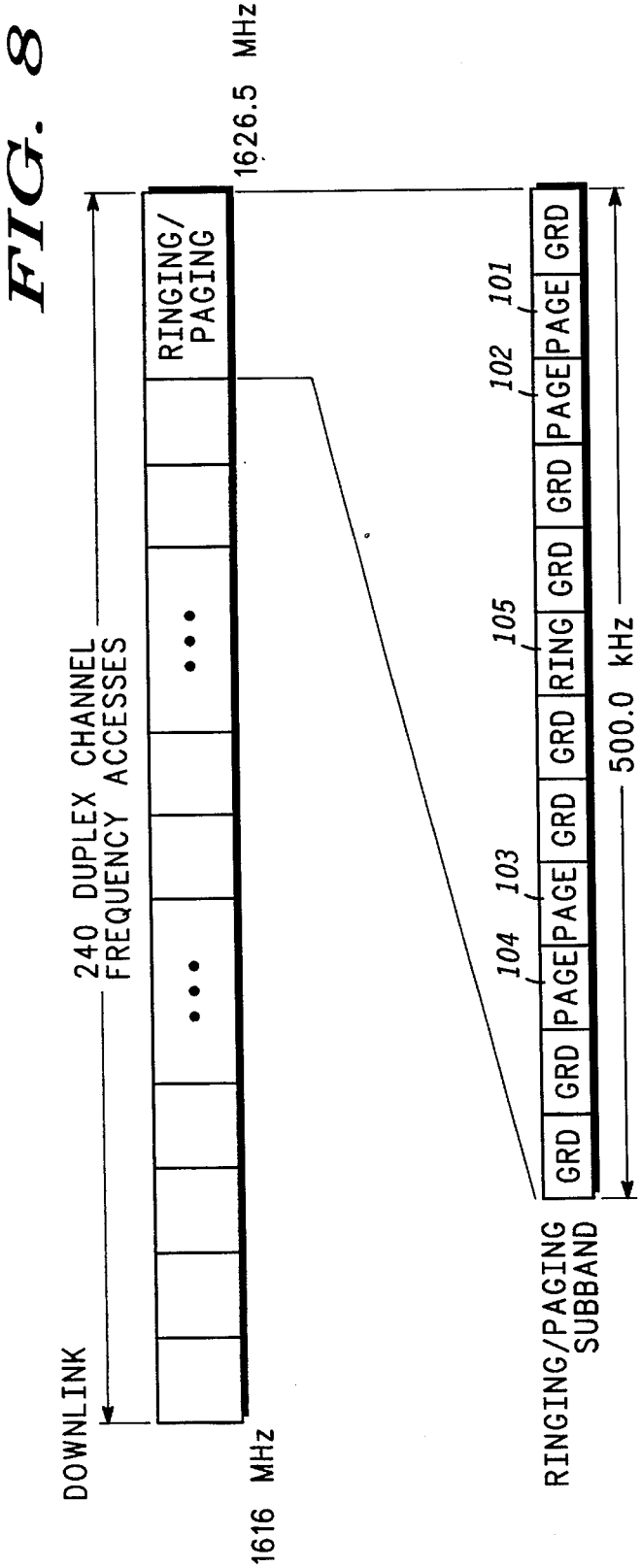

5,596,315

MESSAGE UNIT FOR USE WITH MULTI-BEAM SATELLITE-BASED MESSAGING SYSTEM AND METHOD OF OPERATION THEREOF

RELATED INVENTIONS

The present invention is related to the following inventions which are assigned to the same assignee as the present invention:

(1) Satellite-Based Cellular Messaging System and Method of Operation Thereof, Ser. No. 08/317,090;

(2) Satellite-Based Messaging System Transmitting During Guard Band of Satellite-Based Telephone System and Method of Operation Thereof, Ser. No. 08/317,090;

(3) TDMA Satellite-Based Messaging System and Method of Operation Thereof, Ser. No. 08/317,092;

(4) Message Unit Having Channel Assignment Table For Use With Multi-Channel Satellite-Based Messaging System and Method of Operation Thereof, Ser. No. 08/317,091;

(5) Satellite-Based Ring Alert Apparatus and Method of Use, Ser. No. 08/317,082; all filed concurrently herewith; and (6) Paging System, Ser. No. 07/845,413, filed Mar. 3, 1992, now abandoned; and (7) Distributed Multi-Outlet Paging, Ser. No. Ser. No. 08/042,435, filed Apr. 5, 1993.

TECHNICAL FIELD

This invention relates generally to satellite cellular communications systems and, in particular, to a message unit for use with a multi-beam, satellite-based, world-wide cellular messaging system.

BACKGROUND OF THE INVENTION

Simplex data communication systems, also known as one-way or passive systems, are employed in connection with paging. Generally speaking, one or more transmitters broadcast data communications. The communications include data which identify specific pagers. A population of pagers continually receive the broadcast communications. When one of the population of pagers identifies a communication directed to it, it alerts a subscriber to the incoming communication and often displays a numeric or alpha-numeric message carried by the communication. Due to the simplex nature of such systems, the system does not know when a pager fails to receive a communication directed to it. On the other hand, these simplex systems have many desirable features. Due to the absence of a transmitter and signal transmission capabilities in the pager, a small, low-power, light-weight, readily portable, and inexpensive unit results.

Conventional paging systems experience a problem related to a limited range. A paging system works only when its pagers reside within the area covered by the system's transmitters. When subscribers travel outside this area, their pagers cannot receive calls.

A related problem is that of limited paging capacity. As an area of coverage increases to better serve subscriber needs, the population of pagers likewise increases. As the population of pagers increases, the number of data communications increases. Thus, as the coverage area increases, a point of diminishing returns is reached. The number of data communications is so great that an unacceptable delay in the delivery of calls is experienced. Of course, system capacity could be increased by utilizing pagers which receive data communications over multiple channels. Unfortunately, this causes the cost of the pagers and paging service to increase to unacceptable levels.

Another problem with conventional paging systems is concerned with signal quality such as multipathing, interference, signal reflections, and the like. Generally, pagers are worn by users while engaging in their normal daily activities. These normal activities place the users inside automobiles, inside buildings, near large grounded structures, and in other spaces which electromagnetic signals have trouble penetrating. Consequently, the pagers' ability to receive communications varies considerably. To maximize a pager's ability to receive communications in all surroundings within the coverage area, paging systems are typically designed to utilize a low data-rate FSK modulation scheme in which transmitter power is boosted to a level that achieves an acceptable link margin. In addition, in simulcast paging systems the number of transmitters may be multiplied and geographically distributed throughout the covered area. The addition of transmitters and adjustment of power levels to achieve an acceptable link margin throughout the coverage area is typically a slow, trial-and-error process.

The use of satellites in paging addresses the limited range problem of conventional pager systems. However, the use of satellites presents its own problems. For example, satellites are typically constrained to using only low-power transmissions. Geostationary satellites are currently used to broadcast to terrestrial repeaters which can then transmit high power signals to nearby pagers. Proposals have been made to integrate a satellite with terrestrial transmitters in a simulcast paging system. However, this requires a satellite in a geostationary orbit, where the satellite is positioned a vast distance above the earth, where the satellite's transmission signal is extremely weak at the surface of the earth, and where the area of coverage on the earth's surface is exceptionally large.

Therefore, there is a substantial need for an improved message unit for use in a satellite-based, worldwide cellular messaging system.

There is also a substantial need for a message unit, in a multi-beam, satellite-based, world-wide cellular messaging system, that is capable of determining the optimum frames to monitor for messages.

There is also a substantial need for a message unit, in a satellite-based, world-wide cellular messaging system, that can synchronize very quickly to its message block.

There is also a substantial need for a message unit, in a satellite-based, world-wide cellular messaging system, that comprises a mechanism for achieving significant savings in its battery resource.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 7 shows the fundamental TDMA frame.

FIG. 8 shows a conceptual diagram of the overall frequency plan, including the paging frequency allocation, for downlink communications in the communications system of the present invention.

DESCRIPTION OF THE PREFERRED EMBODIMENT

Figure 1:
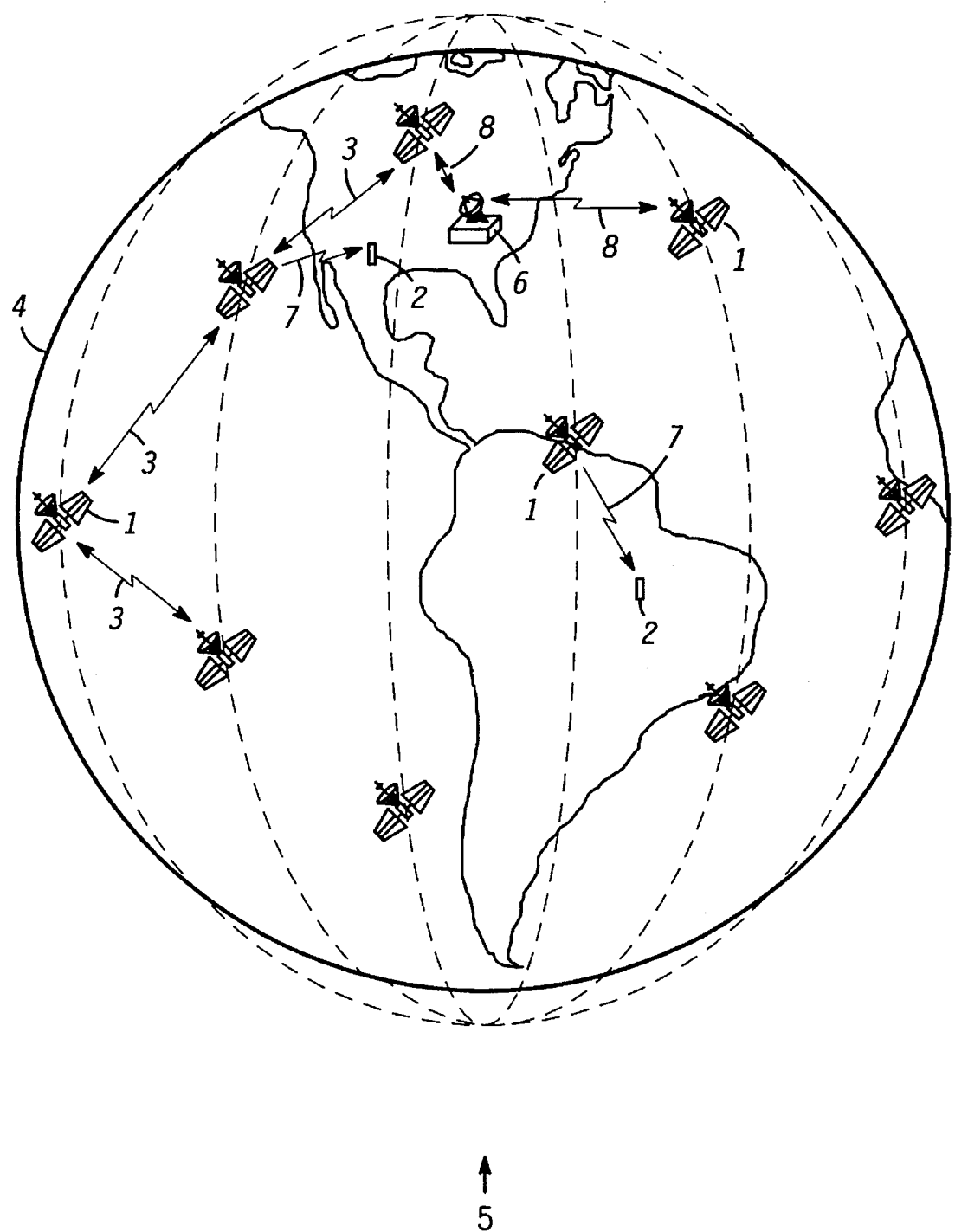
FIG. 1 shows an overview diagram of a satellite cellular communications system in accordance with the present invention.

FIG. 1 shows an overview diagram of a satellite cellular communications system in accordance with the present invention. In accordance with a preferred embodiment, several satellites (also referred to as space vehicles or SV's) 1 are placed in a relatively low orbit around the earth 4. If, for example, satellites 1 are placed in orbits which are around 765 km above earth 4, then an overhead satellite 1 travels at a speed of around 25,000 km/hr with respect to a point on the surface of earth 4. This allows a satellite 1 to be within view of a point on the surface of the earth 4 for a maximum period of around nine minutes. Due to the relatively low orbits of satellites 1, line-of-sight electromagnetic transmissions from any one satellite cover a relatively small area of the earth 4 at any point in time. For example, when satellites 1 occupy orbits at around 765 km above the earth, such transmissions cover areas around 4075 km in diameter. Moreover, nothing prevents satellites 1 from incorporating directional antennas which further divide this area into smaller cells. As illustrated in FIG. 1, satellites 1 are preferably placed in orbits so that the entire constellation of satellites 1 provides continual coverage for the entirety of earth 4.

System 5 additionally includes one or more central switching offices (also referred to as "gateways") 6. Offices 6 reside on the surface of earth 4 and are in data communication with nearby ones of satellites 1 through RF communication links 8. Satellites 1 are also in data communication with one another through data communication links 3. Hence, through the constellation of satellites 1, an office 6 may control communications delivered to any size region of the earth 4. Offices 6 couple to public switched telecommunication networks (not shown), through which requests for the placement of calls to subscribers of system 5 may be received. Each office 6 receives requests to place calls to subscribers believed to be located in a region of the earth 4 associated with that office 6. FIG. 1 shows only one office 6 for convenience. However, those skilled in the art will appreciate that any number of offices 6 may be employed in association with any number of regions of the earth 4. Each of such offices 6 operates substantially as described herein.

System 5 also includes any number, potentially in the millions, of call receivers 2. Call receivers 2 may be configured as conventional pagers or may be included within other portable equipment. Although call receivers 2 are referred to hereinafter as pagers 2 for simplicity, those skilled in the art will appreciate that pagers 2 within system 5 need not be included only in units dedicated to traditional paging functions. Pagers 2 are configured to receive communications from overhead satellites 1 and to perform other functions which are discussed below.

Communications from satellites 1 are received at pagers 2 over communication links 7. In a preferred embodiment of the present invention, links 7 utilize RF frequencies which accommodate substantially line-of-sight communication, and links 7 are simplex links. In other words, communications travel only in one direction from satellites 1 to pagers 2. Simplex communication allows pagers 2 to be manufactured as small, inexpensive units and to consume a minimal amount of power. No simplex communication limitation is implied with respect to links 3 or 8.

Figure 2:
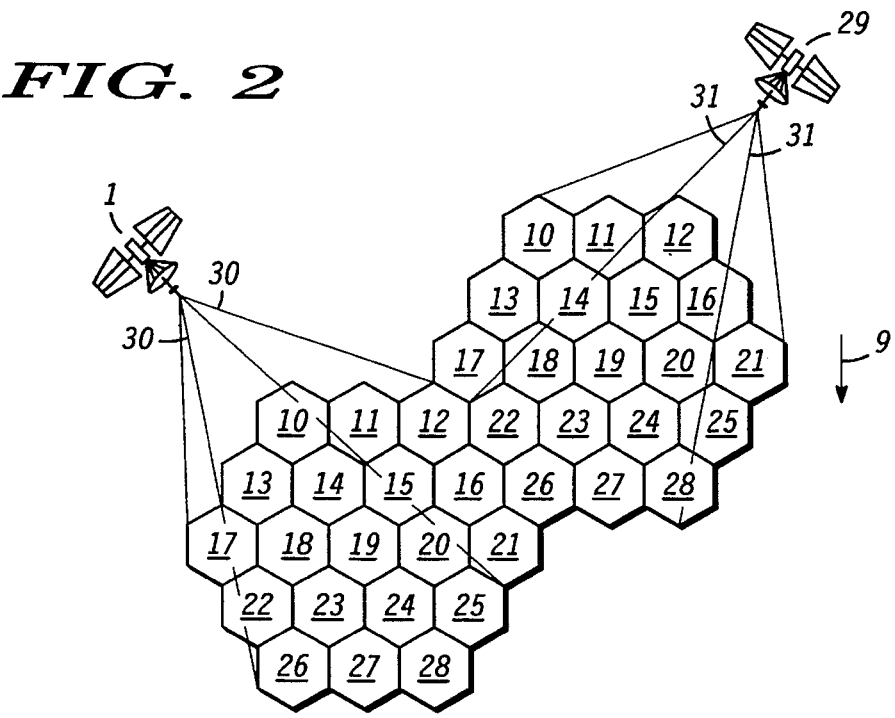
FIG. 2 shows a diagram of cellular patterns formed by adjacent satellites projecting communication beams upon the surface of the earth in accordance with one aspect of the present invention.

FIG. 2 shows a diagram of cellular patterns formed by adjacent satellites projecting communication beams upon the surface of the earth in accordance with one aspect of the present invention.

Satellites 1 and 29 (which may be identical to satellite 1) employ frequency spectrum reuse techniques. These techniques comprise cellular partitioning of projection beamwidths. Satellites 1 and 29 generate beam set projections 30 and 31, respectively. Beam set projections 30 and 31 are bi-directional gain areas (cells) associated with antennas on satellites 1 and 29. These antennas may be individual directional antennas or a phased-array antenna capable of coherent beam projection.

Cells 10–28 may assume many shapes depending on the gain characteristics of the antennas. In FIG. 2, cells 10–28 are shown as hexagons for illustrative purposes. Cells 10–28 advance in orbit direction 9 as satellites 1 and 29 orbit in direction 9.

With satellites 1 and 29 traveling at speeds of up to 25,000 km/hr with respect to the earth, cells 10–28 also travel over the earth at close to this speed. At this speed, any given point on the surface of the earth resides within a single cell for no more than around one minute.

Referring again to FIG. 1, satellites 1 communicate with pager units 2 over links 7 using numerous frequency channels. Thus, satellites 1 and pagers 2 desirably employ a frequency division multiple access (FDMA) scheme so that numerous independent communication links may be established simultaneously. The entire spectrum of these numerous frequency channels is available within each cell. For example, a seven-cell frequency reuse pattern, depicted in FIG. 2, is implemented using time division multiple access (TDMA) techniques to prevent interference between adjacent cells.

In other words, while the entire spectrum is available in each cell, adjacent cells are assigned different time slots within which that spectrum may be used. In a preferred embodiment, frames are defined to include at least seven different time slots to correspond to the seven-cell reuse pattern. Cells labeled "10" in FIG. 2 are assigned one time slot, cells labeled "11" are assigned another time slot, and so on. That way, cells which utilize the same spectrum at the same time are geographically spaced apart from one another.

While FIG. 2 illustrates a seven-cell, seven time slot arrangement, those skilled in the art will understand that a larger or smaller reuse pattern can also be used. Those skilled in the art will appreciate that such a TDMA communication scheme is established at satellites 1. Moreover, when satellites 1 move at speeds of up to 25,000 km/hr, Doppler shift and time slot synchronization parameters between a pager unit 2 and a satellite 1 constantly change.

In a preferred embodiment of the present invention, satellites 1 are configured as moving repeaters. In other words, satellites 1 do little more than receive data communication messages from one source and pass these messages on to a destination. Nothing requires all of communication links 3, 8, and 7 to be similar in frequency and/or timing protocol parameters.

Thus, satellites 1 may also re-package messages received from one communication link into a format compatible with another link before passing the messages on. In addition, satellites 1 may include components which help resolve Doppler and timing shift parameters in connection with the operation of links 3, 8, and 7. Satellites 1 may advantageously communicate such parameters to the entities with which they communicate, such as pagers 2, central switching office 6, and other satellites 1, to help in maintaining synchronization with links 3, 8, and 7.

Figure 3:
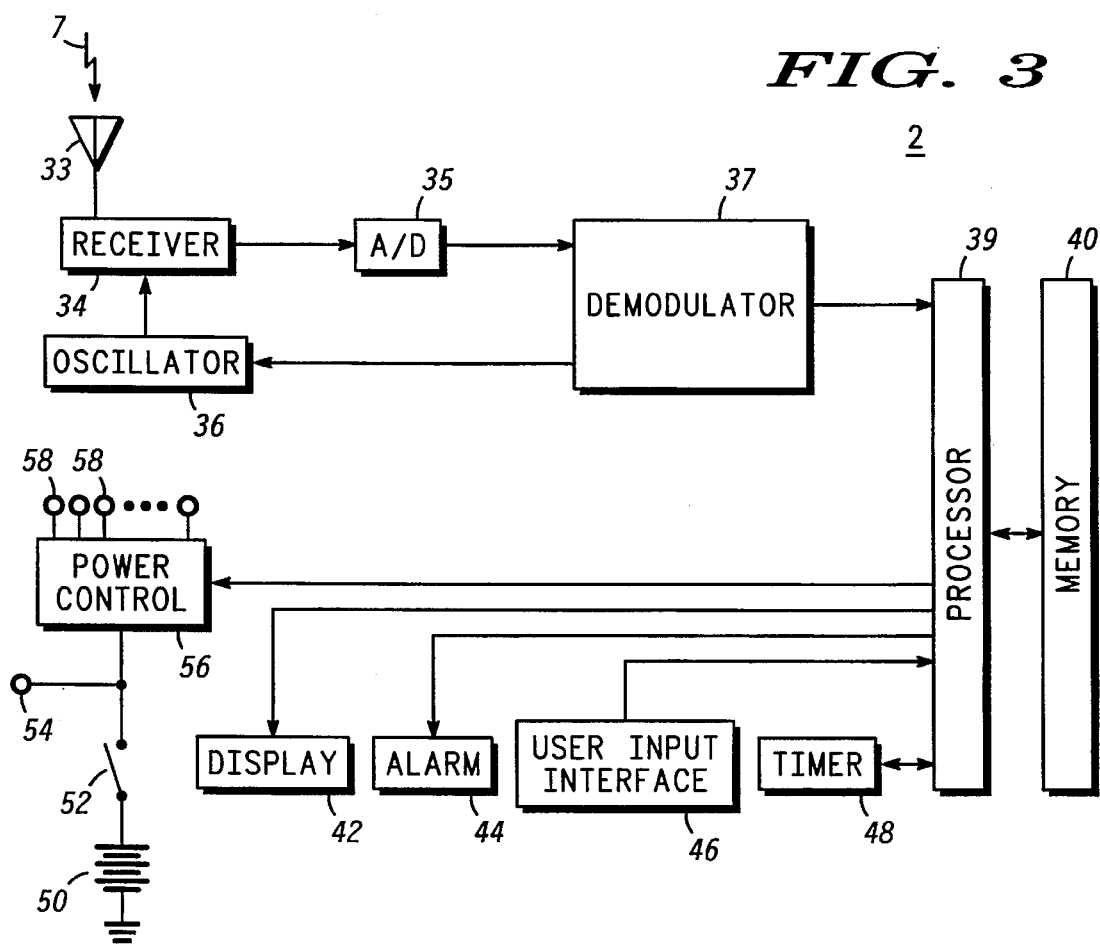
FIG. 3 shows a block diagram of a pager constructed in accordance with one embodiment of the present invention.

FIG. 3 shows a block diagram of a pager 2 constructed in accordance with one embodiment of the present 25 invention. Pager 2 includes an antenna 33 through which communication link 7 is established. Antenna 33 feeds a receiver 34, which includes radio-frequency (RF), mixing, and intermediate-frequency (IF) stages (not shown) as needed to convert RF signals broadcast by satellites 1 to baseband. Receiver 34 couples to an analog-to-digital (A/D) converter 35, which digitizes the baseband signal, and A/D converter 30 couples to a digital demodulator 37 that extracts digital data from the digitized baseband signal.

In preferred embodiments, demodulator 37 recovers bi-phase shift keying (BPSK) encoded data included in the transmission from link 7. Demodulator 37 also supplies a feedback signal to control an oscillator 36. Oscillator 36 provides an oscillation signal that receiver 34 uses in converting the RF signal to baseband.

Demodulator 37 feeds its digital data output to a processor 39. Processor 39 concludes permanently stored data which does not change as a result of operating pager 2. Such permanent data includes computer programs that instruct pager 2 to perform various procedures, which are discussed below. Such permanent data also includes permanent variables which are used in the operation of pager 2, as discussed below. Memory 40 also includes temporary data, which changes as a result of operating pager 2. It is processors 39, under the control of programs stored in memory 40, that controls the operation of pager 2.

Processor 39 couples to various peripheral devices, such as a display 42, an alarm 44, a user input interface 46, and a timer 48. Processor 39 controls display 42 to visibly present data to a user of pager 2. Processor 39 controls alarm 44 to audibly and/or visibly indicate the receipt of a call addressed to pager 2. Processor 39 receives user input, preferably through the operation of keys or buttons (not shown) through interface 46. Processor 39 utilizes timer 48 to synchronize its operations with system timing and, in one embodiment, to keep track of the time of day. Those skilled in the art will appreciate that the function of timer 48 may alternatively be performed within processor 39.

Pager 2 is energized by a battery 50. Battery 50 couples through a power switch 52 to a terminal 54 and to a power control section 56. Power control section 56 switches power to terminals 58 in accordance with commands received from processor 39. Terminal 54 supplies power to at least timer 48. Terminals 58 supply power to the remaining components of pager 2. Pager 2 is de-energized when switch 52 is open, and pager 2 is fully energized and operational when switch 52 is closed and when power is routed to all of terminals 58. Pager 2 may also operate in a energized but low power Sleep Mode. Pager 2 operates in its Sleep Mode when power is not routed to one or more of terminals 58, but switch 52 is closed to route power through terminal 54 to at least timer 48.

Those skilled in the art will appreciate that nothing prevents processor 39 from being de-energized in the Sleep Mode of operation. However, in this situation, timer 48 may advantageously control the application of power to processor 39, rather than processor 39 controlling power to itself as shown in FIG. 3. Moreover, those skilled in the art will appreciate that power may be continuously applied to at least a portion of memory 40 during the Sleep Mode to prevent the destruction of temporary data.

Figure 4:
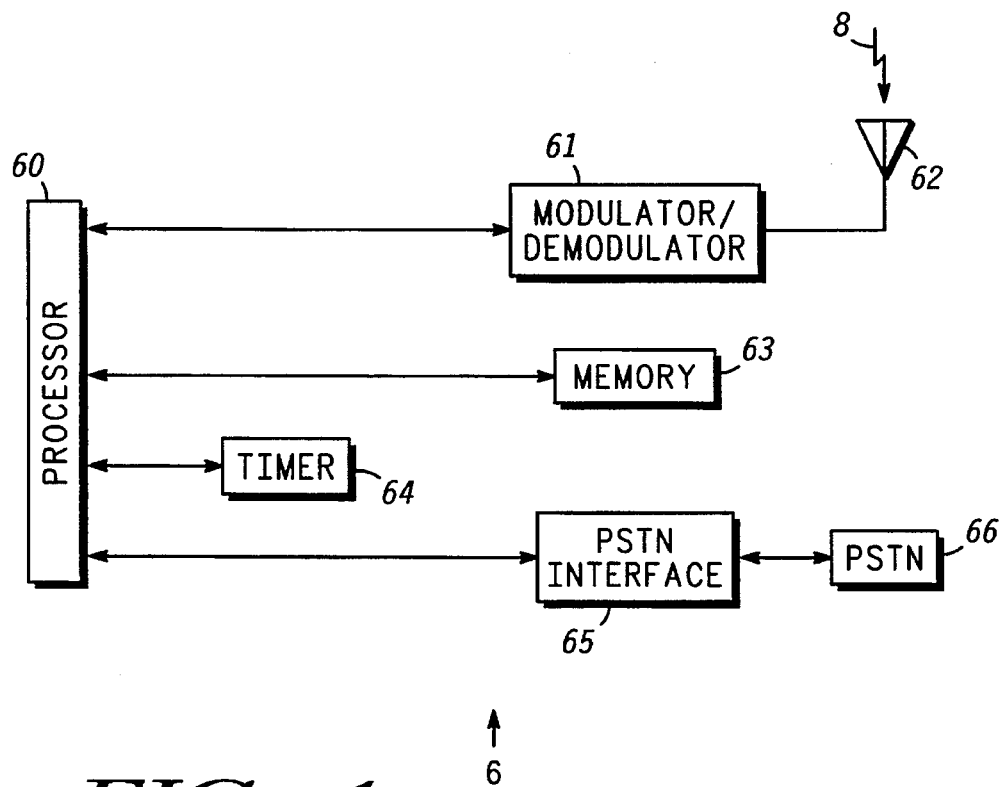
FIG. 4 shows a block diagram of a central switching office or "gateway".

FIG. 4 shows a block diagram of a central switching office or gateway 6. Gateway 6 includes a processor 60, which may be implemented by a single processor or by a network of processors. Processor 60 couples through a modulation/demodulation section 61 to an antenna 62. Antenna 62 is used in establishing communication link 8. Section 61 converts digital data produced (or used) by processor 60 into (or from) modulated RF communications compatible with link 8.

Gateway 6 also includes a memory 63 which stores permanent and temporary data. Such permanent and temporary data include computer programs, data which do not change through operation of gateway 6, and data which change through the operation of gateway 6. A timer 64 also couples to processor 60. Timer 64 allows office 6 to keep a current system time and to act, so that transmissions are sent from gateway 6 in accordance with real-time demands, which are discussed below. Through a public switched telecommunications network (PSTN) interface 65, processor 60 couples to PSTN 66. Requests to place calls to pagers 2 may be received through PSTN 66 and interface 65. In addition, requests to place calls to pagers 2 may be received through the network of satellites 1 (see FIG. 1) and link 8.

Figure 5:
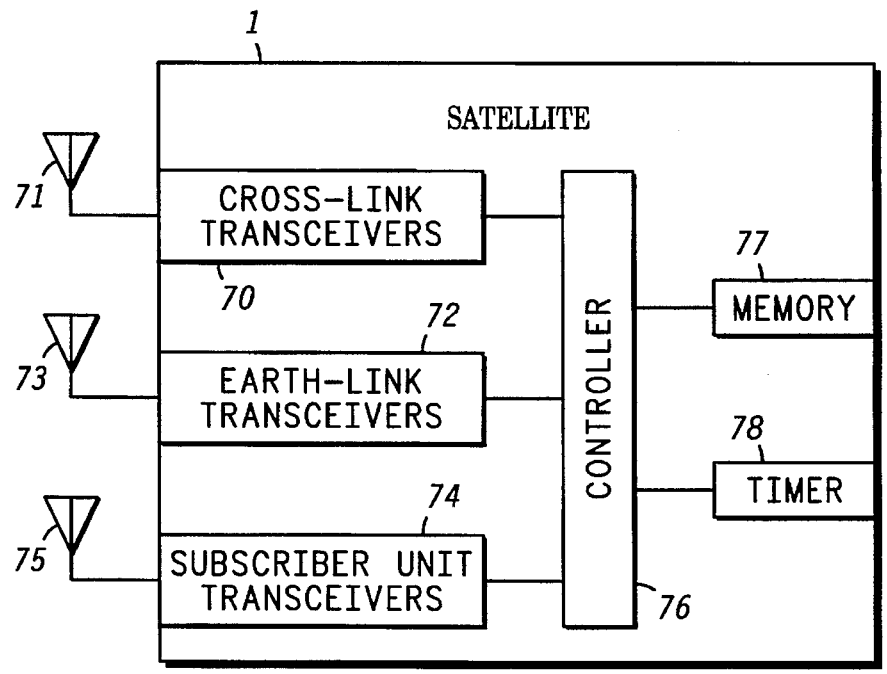
FIG. 5 shows a block diagram of a satellite of the communications system of the present invention.

FIG. 5 shows a block diagram of a satellite of the communications system of the present invention. Preferably, all satellites 1 within system 5 (see FIG. 1) are substantially described by the block diagram of FIG. 5. Satellite 1 includes cross-link transceivers 70 and cross-link antennas 71. Transceivers 70 and antennas 71 support cross-links 3 (FIG. 1) to other nearby satellites 1. Gateway link transceivers 72 and gateway link antennas 73 support gateway links 8 (FIG. 1) to communicate with gateways 6.

Moreover, subscriber unit transceivers 74 and subscriber unit link antennas 75 support pager subscriber units 2 (FIG. 1). Preferably, each satellite 1 may simultaneously support links for up to a thousand or more of subscriber units 2 (FIG.

1). Of course, those skilled in the art will appreciate that antennas 71, 73, and 75 may be implemented either as single multi-directional antennas or as banks of discrete antennas. It is desirable that subscriber unit antenna 75 be a phased-array antenna capable of accessing many cells 10–28 (FIG. 2) simultaneously. In a preferred embodiment, up to forty-eight individual spot beams access an equal number of cells simultaneously.

A controller 76 couples to each of transceivers 70, 72, and 74 as well as to a memory 77 and a timer 78. Controller 76 may be implemented using one or more processors. Controller 76 uses timer 78 to maintain the current date and time. Memory 77 stores data that serve as instructions to controller 76 and that, when executed by controller 76, cause satellite 1 to carry out procedures which are discussed below. In addition, memory 77 includes variables, tables, and databases that are manipulated due to the operation of satellite 1.

Subscriber unit transceivers 74 are desirably multi-channel FDMA/TDMA transceivers capable of transmitting and receiving on all different selectable frequencies during particular, selectable, time slots as directed by controller 76. Subscriber unit transceivers 74 have a sufficient number of channels to provide the desired number of transmission and reception frequencies for communications. Controller 76 may provide for allocation of the frequency and time-slot assignments, generation of ring alert messages and information contained therein. Subscriber unit transceivers 74 desirably provide for transmission and reception on any frequency channel set, so that each subscriber unit transceiver 74 may, if needed, utilize the entire spectral capacity of all frequency channel sets by having the capability to handle all frequency and time slot assignments.

The subscriber unit transceivers transmit the paging carriers at higher power than the general traffic, duplex carriers. This additional power provides improved link margin over the general traffic channels. This additional link margin enhances the ability of the paging carriers to penetrate obstacles such as vehicles and buildings. It also permits less sensitive, and thus less expensive, pager unit receivers to be used with the system.

Overview of Paging System

The paging system of the present invention is capable of delivering page messages anywhere in the world. At the user's discretion, a single message may be sent to a geographic region varying in size from a small local area to total planetary coverage.

Each pager is assigned an operating interval in the timing and frequency hierarchy. The system paging infrastructure assures that pages are delivered when the destination pager is active.

L-Band Subsystem

The L-Band is the portion of the radio frequency spectrum which is used for the satellite link 7 with the subscriber unit. The L-Band subsystem provides two basic types of subscriber channels. Duplex channels support two-way communications services, and simplex channels support one-way messaging services. Duplex services include portable and mobile telephone service, a variety of bearer data services, duplex messaging services, service to mobile exchange units (MXU's) and service to Multi-Line Units (MLU's). Simplex services support the directed messaging service for paging messages.

In addition to the bearer service channels, the L-Band subsystem provides channels that support system overhead functions. These functions include acquisition and access control, subscriber ring alert, subscriber geolocation, and subscriber handoff between antenna spot beams and satellites.

Paging Time and Frequency Control

System access for paging subscribers is limited by the battery life that can be practically obtained in paging units. Pagers are required to operate for a reasonable period of time on inexpensive, easily available batteries if paging is to be commercially viable. This places severe constraints on the activity of the pagers. The present system uses a hierarchical time and frequency strategy to minimize internal pager activity while maintaining adequate paging availability.

The paging communications architecture primarily uses time division multiplexing (TDM) with limited frequency division multiplexing (FDM). These time and frequency resources are organized into an operational hierarchy that determines which time and frequency resources are available at any time.

Each pager is assigned a position in the time and frequency hierarchy when it is built, or when it is reprogrammed. This position determines when the pager is active and what frequency access it monitors. The network paging infrastructure is responsible for tracking the individual pager assignments and insuring that the pages are delivered at the appropriate time on the correct frequency access.

Each 90 ms L-Band frame (described with reference to FIG. 7) includes a simplex channel time slot. A satellite transmits paging bursts on up to two frequency accesses during this time slot during normal (baseline) operation. Two additional bursts on two additional frequency accesses can be transmitted if some of the duplex channel capacity is sacrificed. Each different simplex burst is transmitted in a different main mission antenna beam, so the simplex bursts cover different geographical areas. The four frequency access frequencies are selected from the frequency accesses reserved for paging in a simplex channel band that is licensed for global operation. The frequency accesses and beams used at any time are coordinated among all of the system's satellites to avoid interference.

Each paging burst is time division multiplexed into a system control information field and four Paging Data Fields. In a preferred embodiment, each data field can contain either a 20-character numeric (BCD) message or a 10-character alpha-numeric (ASCII) message. A single page alpha-numeric message may occupy up to four Paging Data Fields. It will be apparent to one of ordinary skill that the Paging Data Fields may be of variable length to provide additional flexibility in the paging system.

As will be explained in greater detail below, the frequency accesses used for paging are assigned a permanent priority and activated by the system control segment according to the paging traffic demand. Frequency accesses are activated in priority order, i.e., the primary paging frequency access is always active. If more paging capacity is required, the secondary frequency access is activated. This continues with the tertiary and quaternary frequency accesses.

Paging Timing Hierarchy

Figure 6:
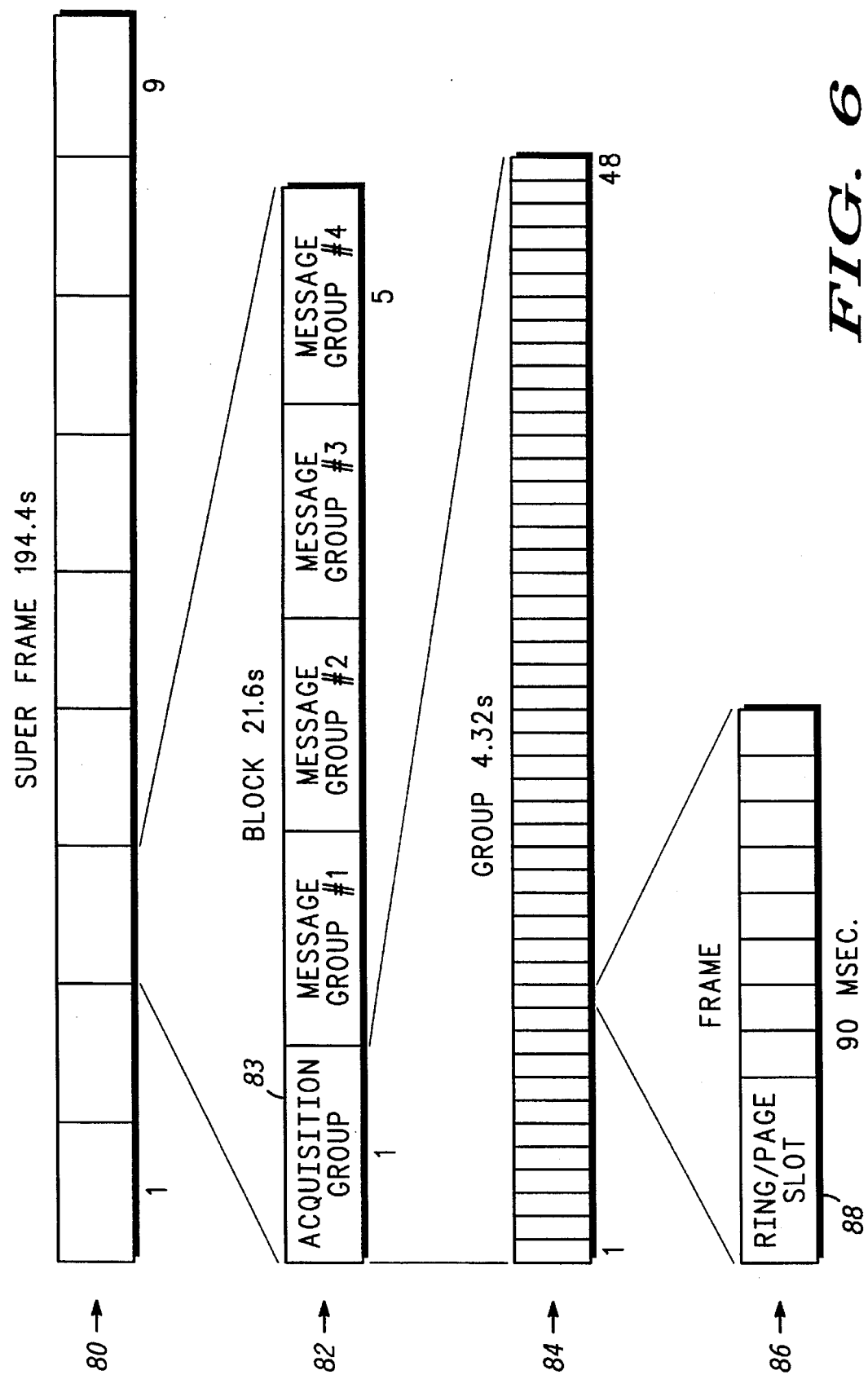
FIG. 6 shows a conceptual diagram of the paging timing hierarchy for the communications system of the present invention.

FIG. 6 shows a conceptual diagram of the paging timing hierarchy for the communications system of the present invention.

Superframe

The paging framing structure uses a four-level timing hierarchy. The highest level of this hierarchy is a 194.4 second (2160 frames) superframe 80. The superframe 80 comprises nine paging blocks 82 of 21.6 seconds (240 frames) each. Each block 82 comprises five groups 84 of 4.32 seconds (forty-eight frames). Finally, each group 84 comprises forty-eight 90 ms L-Band frames 86. The simplex message time slot 88 occupies 20.48 ms of the 90 ms L-Band frame 86. It will be understood by one of ordinary skill that the above-described timing hierarchy is merely exemplary and that many other variations are possible, depending upon the particular system requirement.

Each pager is active during one of blocks 82. Messages may be sent to an active pager during any frame of any group within its active block. Messages are sent to only one beam of the subscriber unit transceiver antenna 75 (FIG. 5) on any active frequency access. The first group of every block 82 is the Acquisition Group 83 for that block. The Acquisition Group 83 includes a special Block Header Message 114 (FIG. 9) that indicates in which frames in the subsequent groups of the block messages will be sent to the area covered by the Acquisition Group 83. This allows pagers to return to Sleep Mode if they are not in an area that will receive paging traffic during their assigned block. The remaining four groups are message groups which do not include the Acquisition Group header 83 and which provide most of the message capacity of the block 82.

Channel Multiplexing

The L-Band communications subsystem is a hybrid time division multiple access/frequency division multiple access (TDMA/FDMA) architecture. Each L-Band channel comprises a time slot and a frequency access.

Duplex channels are provided by common frequency band, time division duplexing (TDD), so each duplex service user is provided with an uplink channel and a downlink channel. Circuit switching is used for duplex channel assignment such that each user has exclusive use of the assigned channels until the user terminates his service or until he is handed off to a different channel.

The TDMA/FDMA architecture provides for frequency and time orthogonality between simplex and duplex channels. The time orthogonality ensures that the space vehicle neither transmits the higher powered simplex signals at the same time as the many duplex traffic channels nor transmits any channel while receiving uplink channels. The frequency orthogonality minimizes inter-modulation products generated in one satellite's simplex time slot from interfering with another satellite's uplink time slots. This orthogonal time/frequency architecture requires less satellite peak transmit power as well as less stringent inter-modulation, antenna sidelobe, and filtering requirements than a system which does not restrict the transmit and receive time and frequency.

FIG. 7 shows the fundamental TDMA frame. This corresponds to frame 86 in FIG. 6.

Simplex channels are active during the guard time slot 88 between the duplex channel downlink time slots 91 and the duplex channel uplink time slots 90. In the present embodiment this band provides between two and four paging channels and the ring alert channel.

TDMA Frame

The fundamental unit of the TDMA channel is a time slot. Time slots are organized into 90 ms frames 86. The L-Band subsystem TDMA frame 86 is illustrated in FIG. 7. The frame 86 comprises a ringing and paging time slot 88, followed by four uplink time slots 90 and four downlink time slots 91. As shown by the narrow spaces in FIG. 7, the time slots are separated by various guard times.

A 2400 bps traffic channel uses one uplink and one downlink time slot each frame 86. A 4800 bps traffic channel uses two contiguous uplink and two contiguous downlink time slots each frame 86. The two contiguous uplink time slots must be in the same frequency access, and the two contiguous downlink time slots must be in the same frequency access. Uplink and downlink time slots associated with a particular channel need not be in the same frequency access.

The 90 ms L-Band frame 86 provides 2250 symbols per frame at the channel burst modulation rate of 25 ksps. Except for acquisition channels and the uplink portion of sync channels which use differentially encoded BPSK modulation, the channels all use differentially encoded quadrature phase-shift key (QPSK) modulation with a channel bit rate of 50 kbps.

In the present implementation, the time slots and guard times are defined in terms of the 20 µs channel bit interval, so that the frame clock and bit clocks are coherent with each other.

The four uplink 90 and four downlink 91 time slots form the TDD structure used to provide duplex channels. The ring and paging time slot 88 supports the simplex channels.

The TDMA frame 86 includes guard times to allow hardware set-up and to provide tolerance for the uplink channels.

The separation 88 between downlink and uplink time slots provided by the simplex time slot with its associated guard times avoids satellite-to-satellite interference and phone-to-phone interference. As a result, any frequency used during time slot 88 is not available for use in the duplex traffic channels, and it must be separated far enough from duplex traffic channel frequencies that it can be rejected with practical filters.

Paging Frequency Hierarchy

FIG. 8 shows a conceptual diagram of the overall frequency plan, including the paging frequency allocation, for downlink communications in the communications system of the present invention.

In FIG. 8 the term "PAGE" designates a paging channel; the term "RING" designates a ringing channel; and the term "GRD" designates a guard channel.

It should be noted that the number of channels and the order in which the various channels are assigned in the band are merely illustrative and that many variations are possible.

FDMA Frequency Plan

The fundamental unit of frequency in the FDMA structure of the present invention is a frequency access which occupies a predetermined bandwidth. Each channel uses one frequency access. The frequency accesses used for duplex channels are organized into subbands each of which contains eight frequency accesses.

A twelve-frequency access band is reserved for the simplex (ring alert and paging) channels. These frequency accesses are only used for downlink signals, and they are the only L-Band frequencies that may be transmitted during the simplex time slot. The satellite receivers are designed to reject these signals, so that the energy in this band that propagates from satellite to satellite will not interfere with duplex channel operation.

In addition, the subscriber unit transceiver antenna 75 (FIG. 5) is designed with sufficient transmitter linearity so that the ringing and paging carriers do not generate harmful interference in the duplex channel band. Thus the simplex time slot allows TDD operation by isolating downlink transmissions in the duplex band from uplink transmissions in the same band, while providing useful system operation in the simplex band.

The paging channel is transmitted by the space vehicle at a significantly higher power level than the traffic channels, and the ring alert signal is transmitted at a moderately higher level than the traffic channels.

In the present implementation of the invention only three of the simplex frequency accesses 101, 102, 105 are available to carry traffic. The remaining frequency accesses are guard bands. One of the active frequency accesses is assigned to the ring alert channel 105, while the other two (101, 102) are used as paging carriers.

However, additional paging capacity may be provided merely by activating additional frequency accesses (e.g. 103, 104) to carry paging traffic. It will be understood that adding paging capacity may reduce duplex capacity, depending upon the characteristics of the subscriber unit transceiver antenna.

Frequency Accesses

The paging subsystem may use up to four frequency accesses. The primary paging frequency access is always active during the Acquisition Group 83 of each block. Other paging frequency accesses are activated in the message groups under system control in areas where the paging traffic cannot be delivered by the primary frequency access alone. Frequencies are activated in the hierarchical sequence. The Acquisition Group 83 of each block includes a message (i.e. Block Header Message 114) that indicates which paging frequency accesses are active during that block.

Each pager is assigned a frequency access table that indicates which access to monitor as a function of which accesses are active at a particular time. This assignment may be made, for example, when the pager is manufactured. It may also be reprogrammed over the primary paging channel. An example of a frequency assignment table is illustrated in TABLE 1. Note that only the first entry of TABLE 1 is identical for all pagers.

TABLE 1

EXAMPLE PAGER FREQUENCY ACCESS ASSIGNMENT TABLE

| HIGHEST ACTIVE FREQUENCY ACCESS | ACCESS TO MONITOR |
| --- | --- |
| Primary | Primary |
| Secondary | Primary |
| Tertiary | Tertiary |
| Quaternary | Tertiary |

Paging Burst Structure

Figure 9:
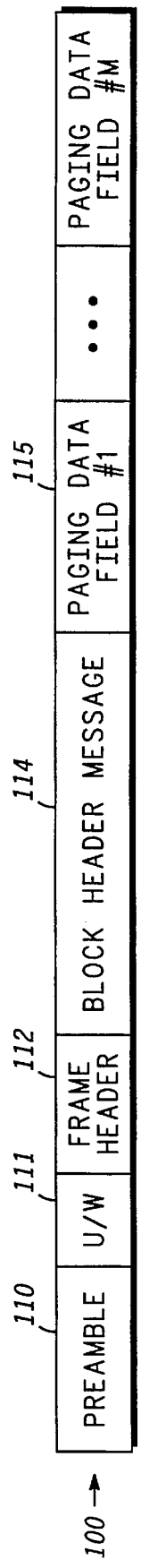
FIG. 9 shows the structure of a paging burst occurring within an Acquisition Group in the communications system of the present invention.

FIG. 9 shows the structure of a paging burst 100 occurring within an Acquisition Group 83 in the communications system of the present invention.

A paging burst 100 occurring within the Acquisition Group 83 (FIG. 6) is transmitted during the ringing/paging time slot 88 (FIG. 7) and may be on the PAGE channels 101 or 102 (FIG. 8), for example.

As shown in FIG. 9, paging burst 100 comprises a Preamble portion 110, a Unique Word portion 111, a Frame Header 112, a Block Header Message 114, and M Paging Data Fields 115. In a preferred embodiment, M=2.

Figure 10:
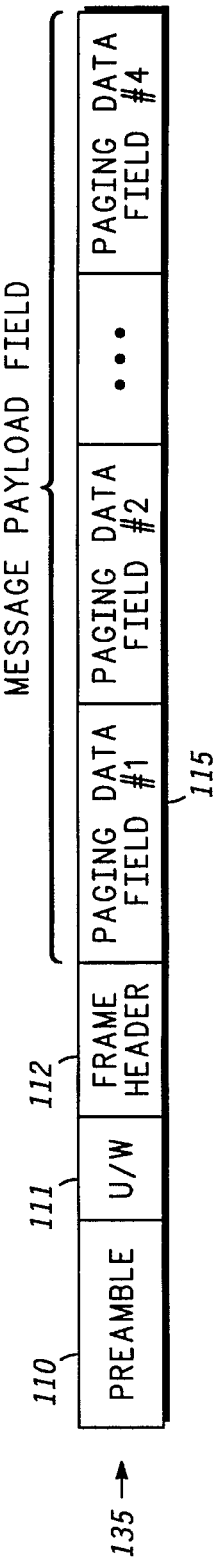
FIG. 10 shows the structure of a paging burst occurring within subsequent groups in the communications system of the present invention.

FIG. 10 shows the structure of a paging burst 135 occurring within subsequent groups in the communications system of the present invention.

A paging burst 135 not occurring within the Acquisition Group 83 comprises the same portions as paging burst 100, but it has an expanded Message Payload Field, because it does not have a Block Header Message 114. The Message Payload Field may comprise N Paging Data Fields. In a preferred embodiment, N=4. It will be understood, however, that the Paging Data Fields may be of variable length and thus M and N will also vary.

Except for the Preamble and the Unique Word, the burst fields include forward error correction bits as well as data bits. The paging burst Preamble comprises 2.56 ms of unmodulated frequency access. The Unique Word is "789" Hexadecimal.

Paging Frame Header Contents

The Frame Header Field 112, which is included in each paging burst, comprises a Block ID, a Group ID, a Frame ID, and a Frequency Access ID. The field may include an additional bit allocation for error correction coding.

Block Header Contents

Figure 11:
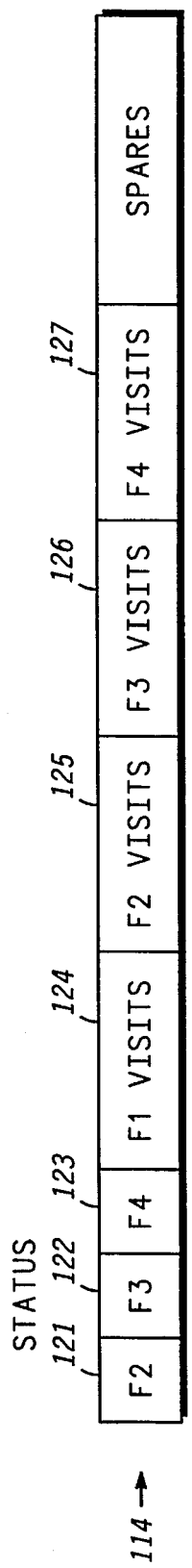
FIG. 11 shows the structure of a Block Header Message of the communications system of the present invention.

FIG. 11 shows the structure of a Block Header Message 114 of the communications system of the present invention.

The first forty-eight frame group in each block 82 is an Acquisition Group 83. Each frame within the Acquisition Group may be transmitted on a different one of the active frequency accesses, although it will be understood that just the primary paging frequency access may be used during the Acquisition Group to reduce the system complexity.

In a preferred embodiment, the Acquisition Group 83 uses the first two data fields as a Block Header Message 114. The remaining two data fields are available for numeric paging messages.

As shown in FIG. 11, the Block Header Message 114 comprises a Secondary Frequency Access Status Field 121, a Tertiary Frequency Access Status Field 122, a Quaternary Frequency Access Status Field 123, a Primary Frequency Visit Field 124, a Secondary Frequency Visit Field 125, a Tertiary Frequency Visit Field 126, and a Quaternary Frequency Visit Field 127.

The Secondary, Tertiary, and Quaternary Frequency Access Status fields indicate the current and future (i.e. within the next superframe) operational status of the corresponding frequency accesses, as shown in greater detail below in TABLE 2.

TABLE 2

FREQUENCY ACCESS STATUS CODES

| BITS | FUNCTION |
| --- | --- |
| 00 | Inactive |
| 01 | Inactive, will become active next superframe |

TABLE 2-continued

FREQUENCY ACCESS STATUS CODES

| BITS | FUNCTION |
|---|---|
| 10 | Active, will become inactive next superframe |
| 11 | Active |

The Primary, Secondary, Tertiary, and Quaternary Frequency Visit Fields indicate the transmit sequences for each active frequency access. These fields may each contain one bit for each frame in a group, e.g. 48 in a preferred embodiment. If the beam where the Block Header Message 114 was received will be visited by a frequency access during one or more frames in the message groups of the block, the bits corresponding to those frames are set to a 1. Bits corresponding to frames in which this beam is not visited during the message groups of the block are set to 0. Since, in a preferred embodiment, the visit sequences are the same for each message group, four sets of 48 bits are adequate to define the sequence for all possible visits to a beam during a block.

The Block Header Message 114 may also include an additional bit allocation for error correction coding.

It will be understood that if less than all four frequency accesses will be used, some of the Frequency Visit Fields may be used to carry paging messages.

Paging Data Field

Figure 12:
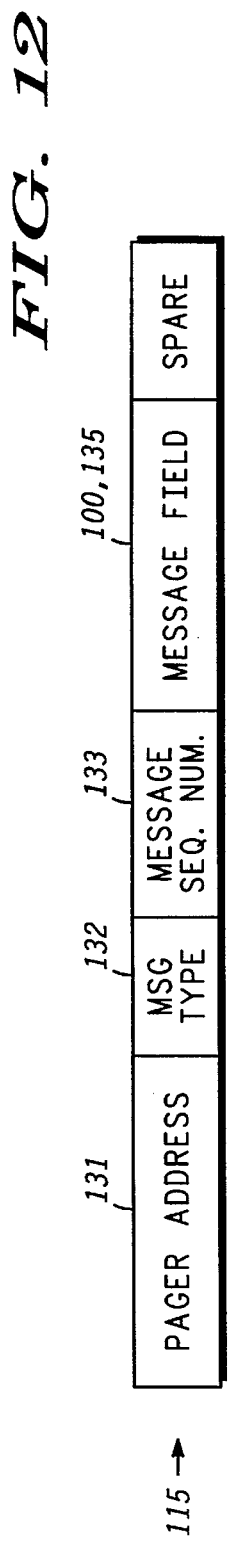
FIG. 12 shows the structure of a Paging Data Field of the communications system of the present invention.

FIG. 12 shows the structure of a Paging Data Field 115 of the communications system of the present invention. Each paging burst contains up to N Paging Data Fields 115 (FIG. 10).

The Paging Data Field 115 comprises a Pager Address field 131, a Message Type field 132, a Message Sequence Number field 133, and a Message Field 135.

The Message Field 135 may contain, for example, a twenty-character numeric message using BCD coding or a ten-character alpha-numeric message using ASCII coding. The Paging Data Field may also include an additional bit allocation for error correction coding.

It will be understood by one of ordinary skill in the art that the Paging Data Field 115 may be configured in many different ways. For example, the Message Type field 132 may be expanded to indicate one of a plurality of different page types, such as stored messages or non-stored messages. Stored messages may tell a subscriber to call home, call the office, etc., or may communicate unique subscriber-defined messages. The use of stored messages conserves the resources of system 5 which are needed to place frequently used pages. The Paging Data Fields may be of varying lengths to provide various types of messages.

All paging information fields may include an additional bit allocation for error correction coding.

Paging Delivery Operation

The operation of the system 5 with regard to the delivery of paging messages will now be described.

Channel Scheduling and Channel Use Restrictions

The system 5 controls the channel scheduling for all of the space vehicles 1. There are a number of channel use restrictions that the system considers in performing this scheduling operation.

Paging is accomplished during the simplex channel time slot 88 at the beginning of each 90 ms frame. In a preferred embodiment, one paging burst may be transmitted into one subscriber unit transceiver antenna (FIG. 5, 75) beam on each active paging frequency access. Only one burst is transmitted into any particular beam in a given frame, and no more than two paging frequency accesses are simultaneously active on one subscriber unit transceiver antenna.

Selection of the beams and frequencies used in a given frame is also restricted to avoid interference with other paging channels and the ring alert channel. This interference is avoided by spatial isolation. That is, simultaneous paging bursts are transmitted in antenna beams that have adequate pattern isolation to insure that they do not interfere with one another.

An important consideration in controlling this interference is the differential Doppler between space vehicles. The Doppler shift in outer beams may be as high as ±37.5 kHz, so it is possible for the primary and secondary or tertiary and quaternary frequency accesses to interfere with each other due to Doppler shift. The system is required to plan the paging frequency allocations, so that these signals are isolated when these Doppler shifts occur.

Message Delivery Scheduling

The delivery of paging messages is coordinated with the sleep/wake cycle of the pager 2 for which a message is intended. A pager 2 is active for receiving messages during one 240-frame (21.6 second) block 82 interval during each 194.4 second superframe 80. In addition, as mentioned above, each pager 2 is assigned a frequency access assignment table (e.g. TABLE 1) which determines which frequency access is used by that pager for any combination of active paging frequency accesses that might be used by the system 5.

Paging messages are transmitted twice to improve the delivery reliability. These deliveries are scheduled to insure that the pages into a given area are transmitted from space vehicle positions with large angular offsets. This angular diversity increases the probability that the shadowing and blockage of various geometric structures (e.g. buildings, mountains, etc.) are uncorrelated between the two delivery attempts. The angular diversity is preferably accomplished by transmitting from space vehicles in two different orbital planes, but it is occasionally necessary to use positions in the same orbital plane but with large angular offsets.

Message Delivery Orders

Figure 13:
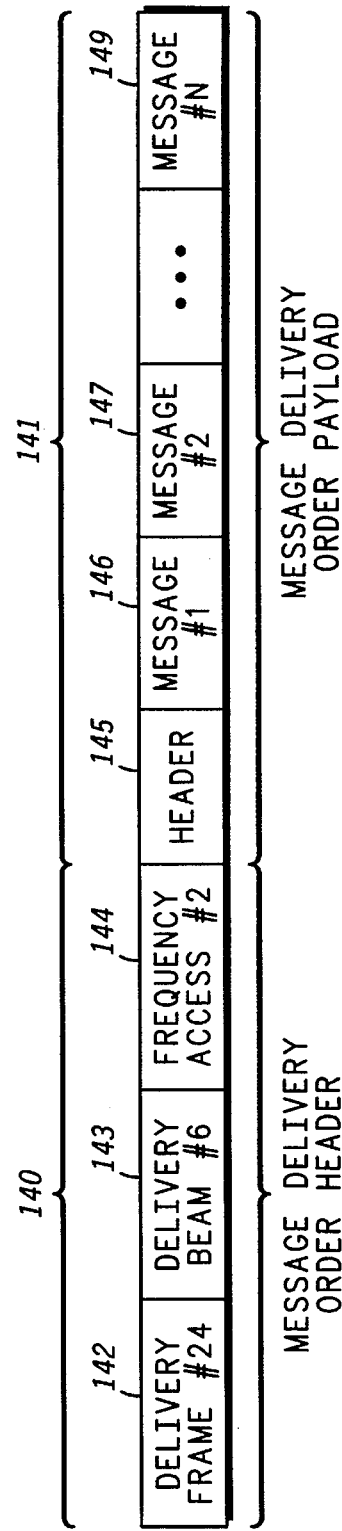
FIG. 13 shows the structure of a Message Delivery Order of the communications system of the present invention.

FIG. 13 shows the structure of a Message Delivery Order of the communications system of the present invention.

The space vehicle receives paging delivery orders from the gateway 6 using the Message Delivery Order (MDO) format shown in FIG. 13. These orders comprise a Message Delivery Order Header 140 and a Message Delivery Order Payload 141.

The Message Order Header 140 comprises a Delivery Frame 142, a Delivery Beam 143, and a Frequency Access 144.

The Message Delivery Order Payload 141 comprises a Header 145, and up to N messages 146–149. In a preferred embodiment N=4.

Each delivery order includes one frame of message data along with the appropriate header information in the correct format for the paging channel. The message payload includes all coding for the L-Band physical channel.

The space vehicle receives an MDO and reads the MDO Header portion 140 to determine the delivery parameters. It then buffers the MDO Payload portion 141 until the appropriate frame. At that time, the space vehicle adds the preamble (FIG. 9, 110) and unique word (FIG. 9, 111) and transmits the paging burst.

Figure 14:
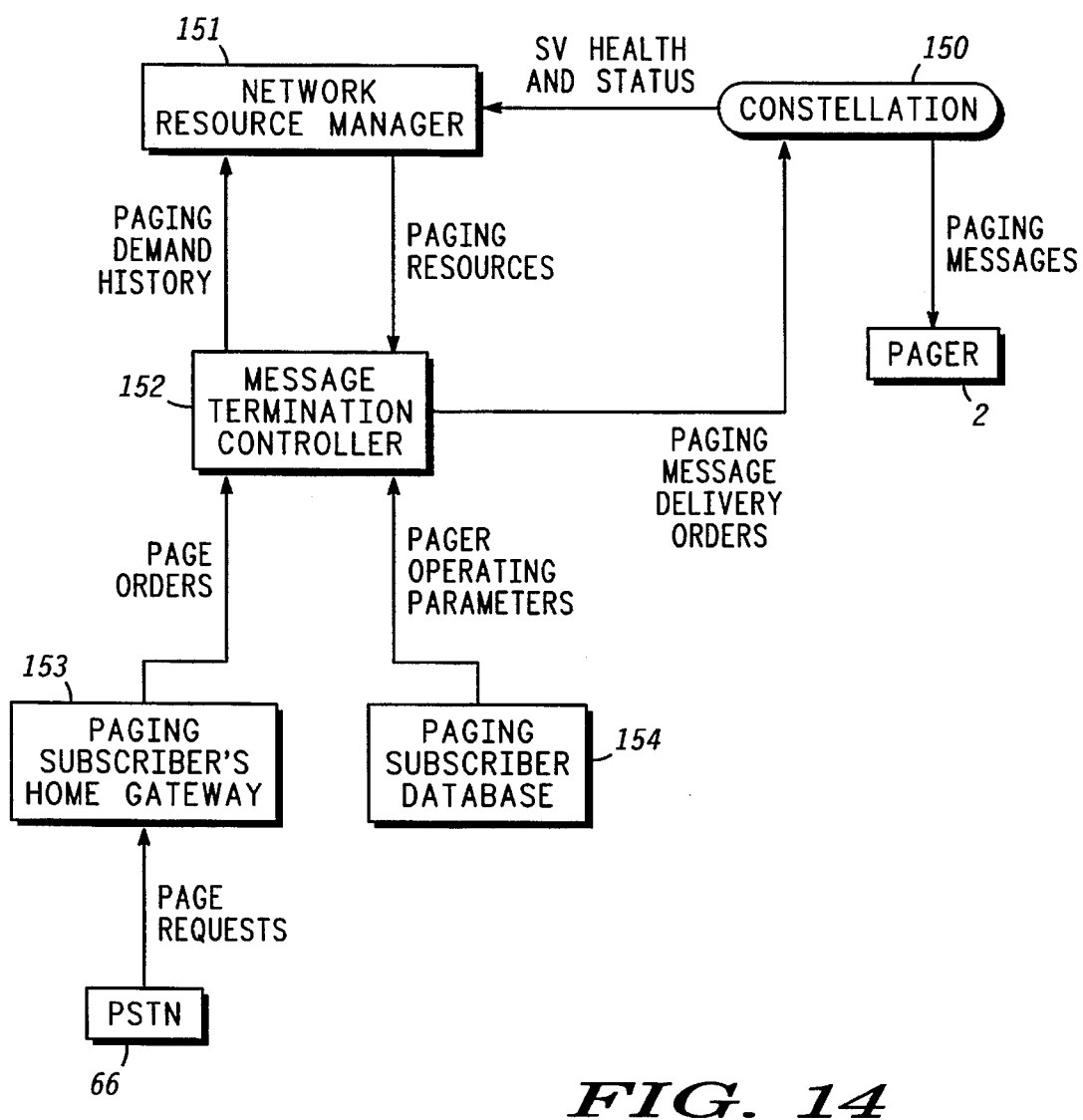
FIG. 14 shows the paging context and information flow of the communications system of the present invention.
Figure 15:
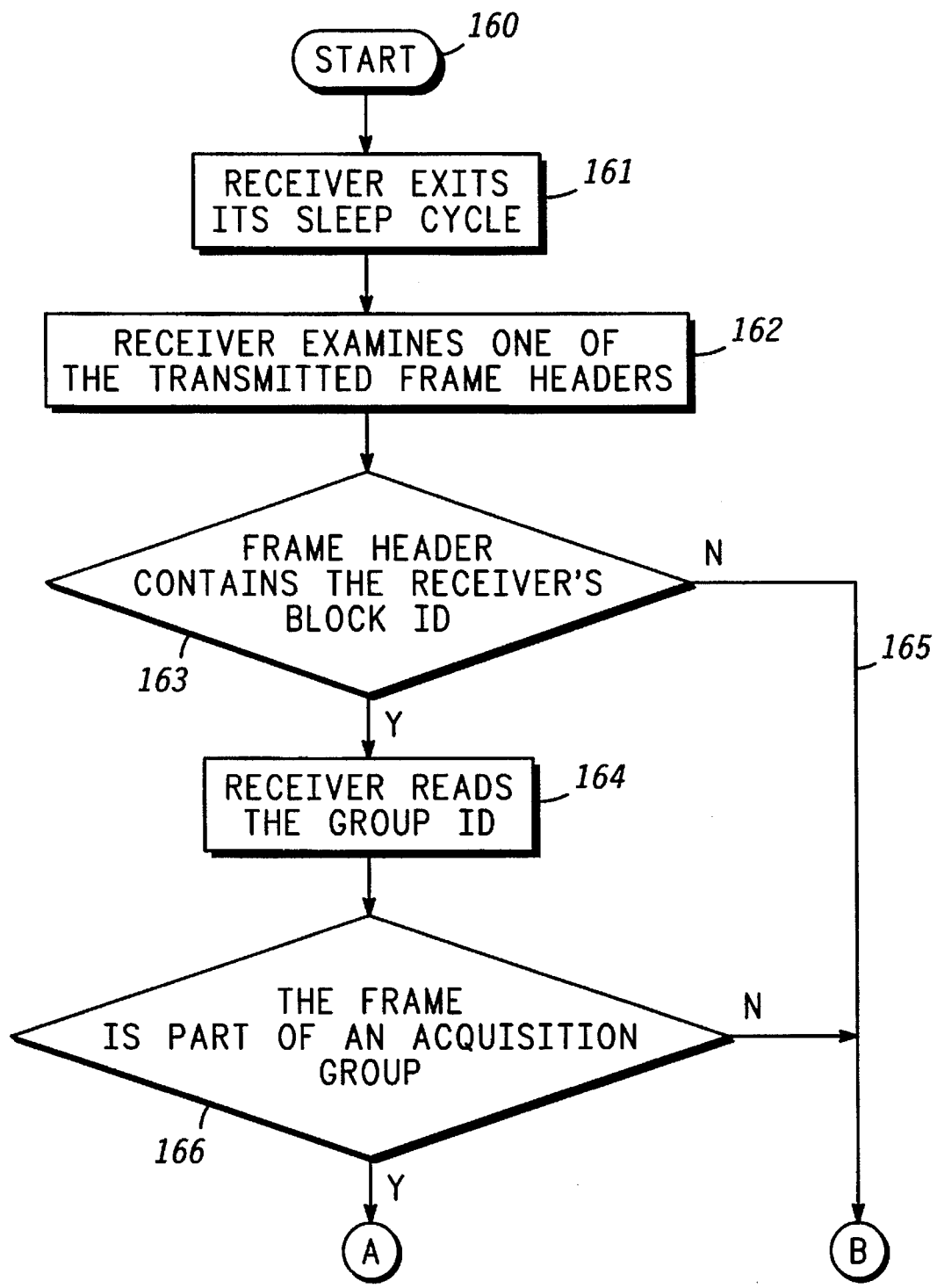
FIGS. 15–19 comprise a composite flow diagram of a method of operating an addressable call receiver, in accordance with the present invention.
Figure 16:
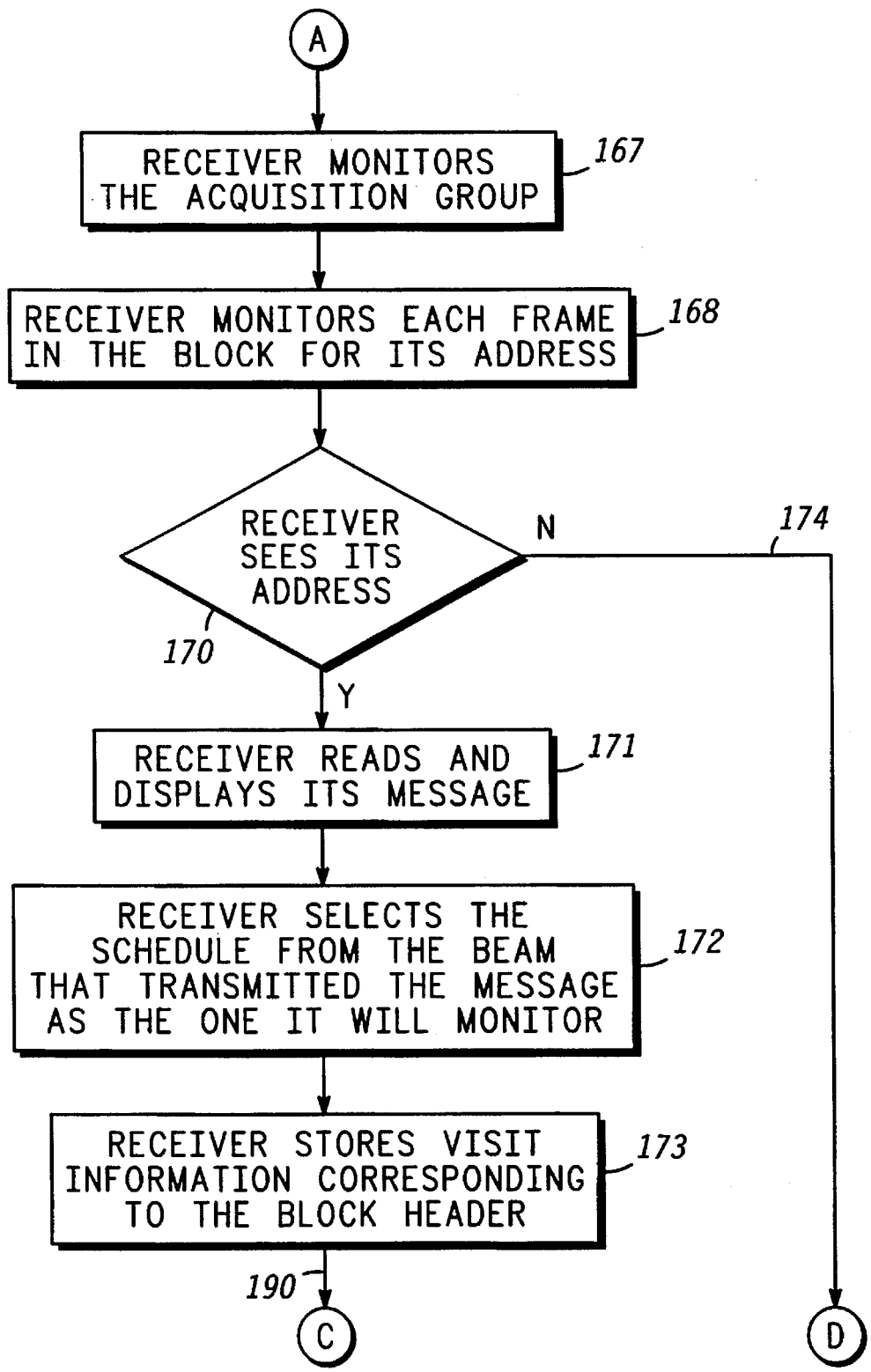
Figure 17:
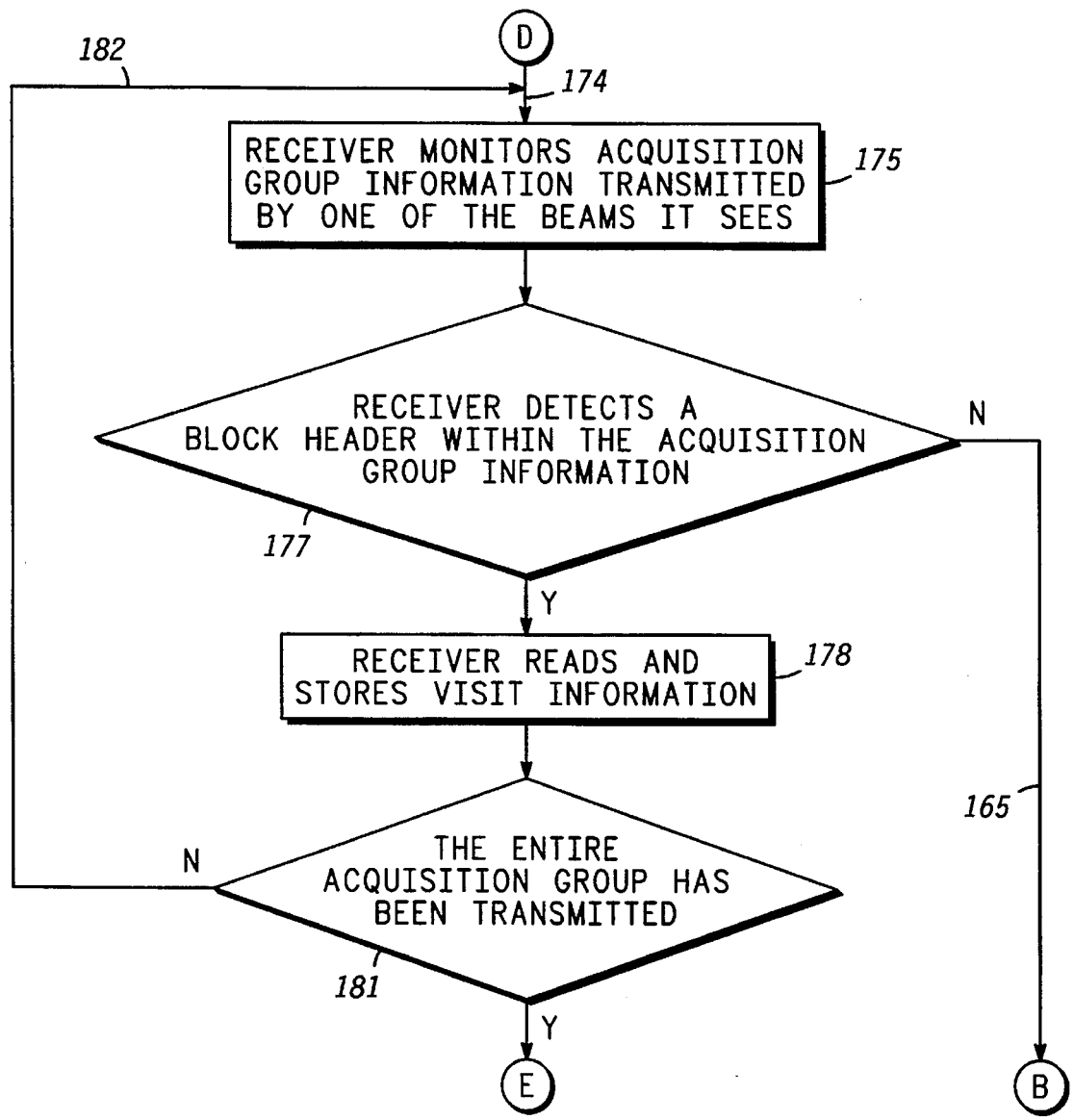
Figure 18:
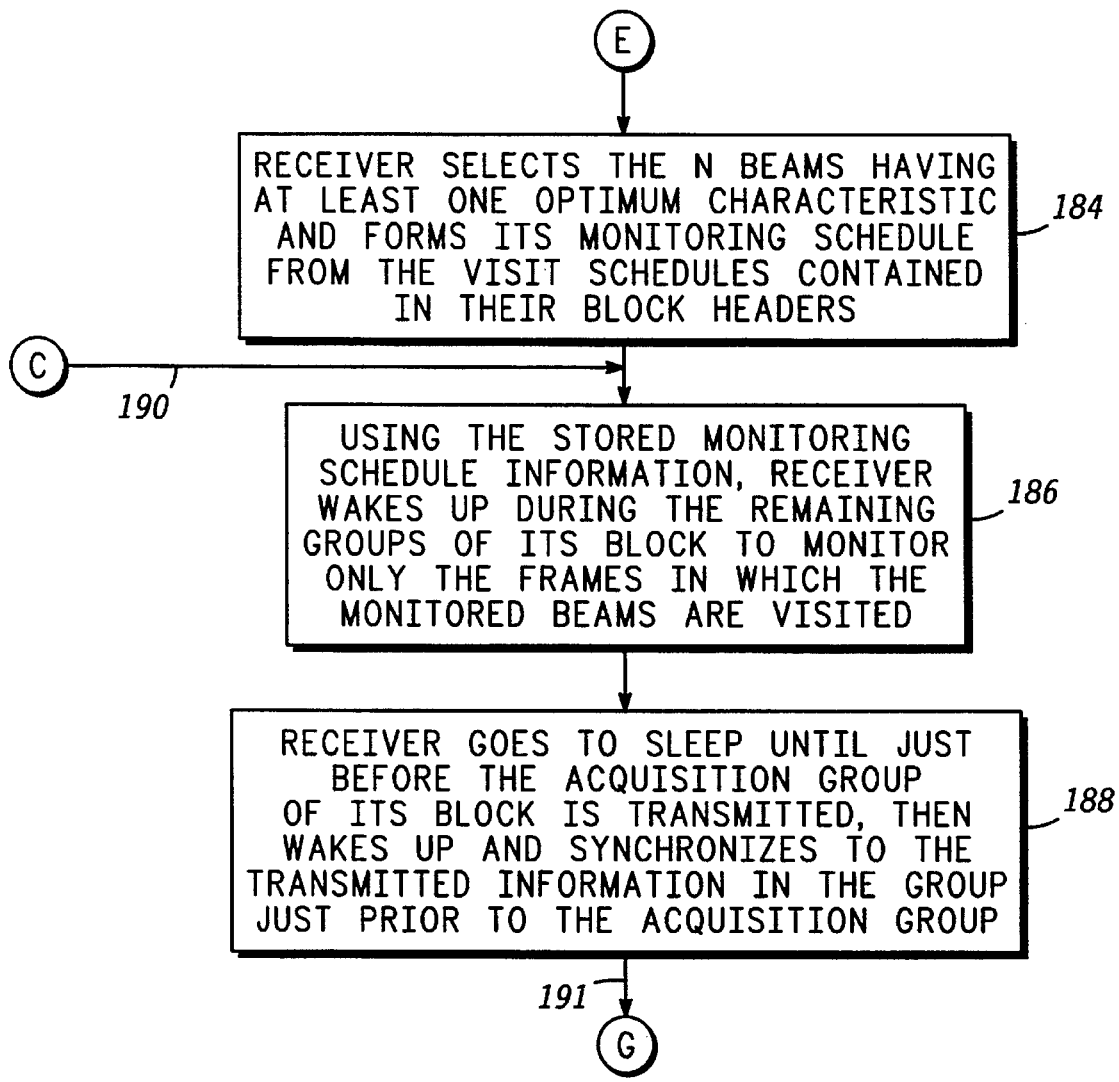
Figure 19:
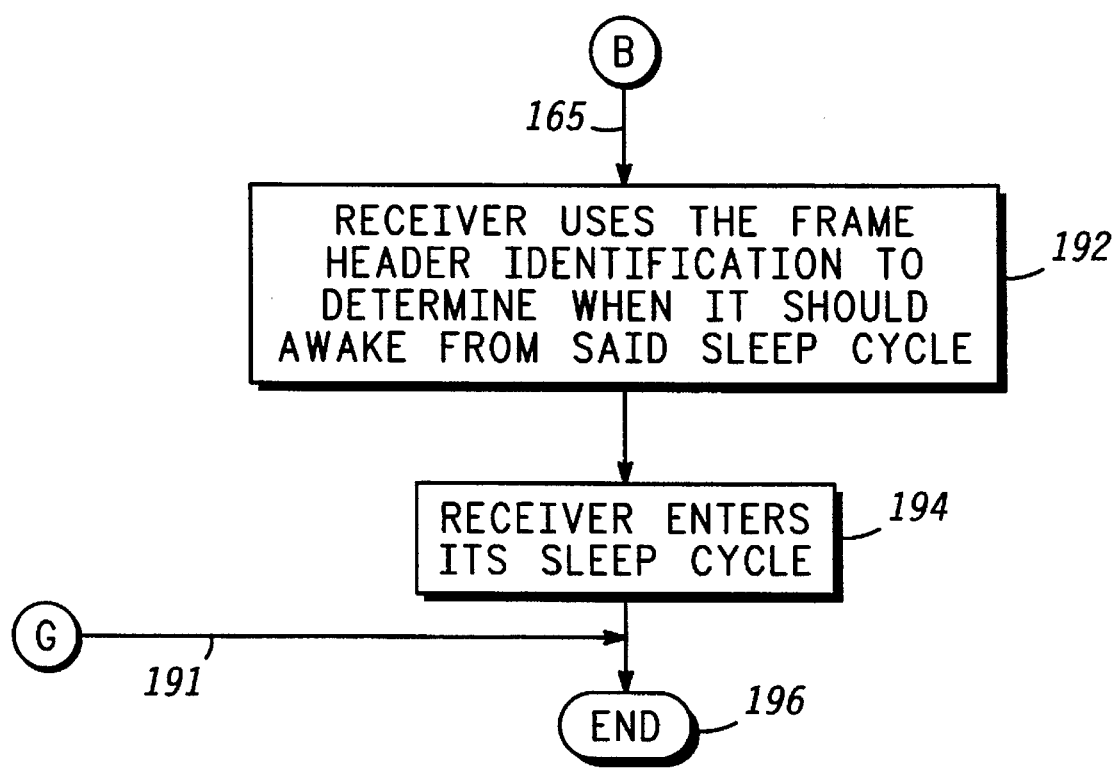

FIG. 14 shows the paging context and information flow of the communications system 5 of the present invention. For the purposes of the following discussion, FIG. 14 includes a Constellation 150 of space vehicles, a Network Resource Manager 151, a Message Termination Controller 152, a Paging Subscriber's Home Gateway 153, a Paging Subscriber Database 154, and PSTN (public switched telecommunications network) 66.

Network Resource Manager 151 resides in a dedicated System Control Segment (SCS) (not shown) whose function includes tracking, telemetry, and control of the Constellation's space vehicles. Message Termination Controller (MTC) 152 and Paging Subscriber Database 154 reside in a gateway 6.

To insure that a message is delivered at the proper time, the system 5 maintains Paging Subscriber Database 154, which includes the active block 82 and the frequency access assignment table (e.g. TABLE 1) for each pager. The Message Termination Controller 152 uses that information to organize sequences of paging messages into delivery orders that are sent to each SV. These delivery orders include one frame of paging data along with the Delivery Frame, Delivery Beam, and Frequency Access (FIG. 13).

Message delivery schedules consider the available SV resources and other channel restrictions along with pager operation. This information is generated by the Network Resource Manager 151 in the System Control Segment (SCS). The SCS uses paging demand projections, projections of other service demand, information about the operational status and energy state of each SV, and interference planning rules to determine which beams may be paged on which frequency accesses in each frame.

These resource allocations are sent to the MTC as a set of constraints which cannot be violated when the page deliveries are scheduled. The MTC aids in projecting future paging traffic by reporting the paging demand history to the SCS. This message flow is illustrated in FIG. 14.

The SV receives the paging Message Delivery Orders and places them in a paging data buffer according to the scheduled Delivery Frame, Delivery Beam, and Frequency Access. At the scheduled frame, the data is read from the buffer, modulated onto the indicated frequency access and transmitted into the specified Delivery Beam. The MTC insures that no more than one paging burst is scheduled for each active Frequency Access or Delivery Beam during any frame.

Message Delivery Orders are transmitted so that they arrive during the group 84 before the group in which they are scheduled to be transmitted. Thus, the SV includes large enough buffers to store two groups (10 kilobytes) of paging data along with the scheduling information.

Paging Channel Operation

The operation of the paging channel of system 5 will now be described.

The first forty-eight frames of each block 82 comprise an Acquisition Group 83 during which one burst is transmitted to every active antenna beam (i.e. forty-eight beams) on an SV by every active frequency access. A different beam is visited during each frame 86 by each active frequency access.

Every active paging frequency access sends an Acquisition Group 83 during these frames. The bursts transmitted during the Acquisition Group 83 contain a Block Header Message (FIG. 9, 114) along with two numeric Page Data Fields 115. This insures that every pager scheduled to operate during that block has an opportunity to receive the acquisition data.

Each frequency access visits a beam once and only once during an Acquisition Group. Thus, if there are less than forty-eight beams active on an SV, some frames have no transmissions or do not transmit on every frequency access. This strategy permits the system to have simultaneous Acquisition Groups on all SV's.

In a preferred embodiment, only the primary paging frequency access is used during the Acquisition Group. This reduces the complexity of the system but may also reduce the paging capacity.

After the Acquisition Group, the remaining paging bursts in the block each contain up to N numeric or alphanumeric pages. Except during the acquisition interval, paging bursts are transmitted only to the beams covering areas for which there is traffic. Every burst includes a Frame Header Message (FIG. 9, 112) which provides the Block ID, Group ID, Frame ID, and Frequency Access ID for that burst. The Frame Header 112 aids the pager when it acquires the system.

During the message groups, the active frequency accesses are rotated through a transmit frame sequence that is fixed for the block. The sequence of transmission frames is scheduled in accordance with the traffic demand.

The System Control Segment (SCS) (not shown) determines which beams served by a particular SV are available to receive paging traffic during a superframe. The paging capacity in a beam at any time is allocated according to a demand projection based on previous paging history. Beams covering areas that are expected to receive a lot of paging traffic are scheduled for as many visits as resource and interference restrictions permit. These multiple transmit sequences are made at the expense of transmission opportunities into areas that are not expected to receive much traffic.

An indication of which frames and frequency accesses will be used for visits to a particular area during a block is included in all of the Block Header Messages 114 transmitted to that beam during the Acquisition Group 83.

The transmission schedules described in the message groups may be different for each active frequency access. For example, the Primary Frequency Access may be used to transmit in frames and beams 1–48; while the Secondary Frequency Access may only be used to transmit in frames 1–10 in beams 10–20.

There is no fixed relationship between the transmit sequences used in these groups by the various frequency accesses. The sequence used by any particular frequency access is, however, repeated in each of the message groups of a particular block.

During the Acquisition Group 83, the alternate (i.e. secondary, tertiary and quaternary) frequency accesses follow transmission sequences with fixed time relationships to the primary channel sequence. The pagers are preprogrammed with this timing, so that they may transfer to the alternate channel and synchronize with the correct sequence without waiting for the next Block Header Message 114. At other times, the alternate frequency accesses visit beams as necessary to serve the traffic requirements in a manner similar to the primary frequency access.

Pager Operation Frequency Selection

The primary paging frequency access, along with the simplex time slot, defines the primary paging channel. On power up and on awaking from their sleep periods, all pagers first acquire the primary channel. The Block Header Message 114 specifies which other paging frequency accesses are active in the message groups. After the Acquisition Group, predetermined groups of pagers transfer to other active paging frequency accesses.

Pagers that transfer to an alternate channel continue to monitor that channel until the Frequency Access Status Fields (FIG. 11, 121–123) in the Block Header Message indicate the channel will be discontinuing operation. This message is sent in the last superframe in which a frequency access will be active.

Alternatively, pagers receiving on an alternate channel may monitor that channel through the block and then return to the primary frequency in the Acquisition Group of the next block.

Occasionally, due to a fade or other channel impairment, a pager may fail to receive a Block Header Message indicating that a channel will be terminated. In this event, the pager continues to monitor a channel until it fails to acquire the Acquisition Group Header for more than a predetermined number of successive superframes, at which time it will switch to the primary channel.

Timing and Synchronization

The battery life of a pager is usually severely limited by practical battery constraints. Pagers may use a low duty sleep/wake cycle to extend this life. This cycle requires extended long sleep periods during which the pager cannot receive signals from the SV's to maintain synchronization with the system. The synchronization problem is exacerbated by the limited stability of oscillators that can practically be implemented in a pager. Using inexpensive oscillators precludes maintaining all but the most rudimentary timing during the sleep period.

The high dynamics of a low-earth orbit system are not compatible with maintaining synchronization over large quiescent periods. The satellites move at a ground speed of about 6.5 kilometers per second. Thus, propagation delays and Doppler frequencies change drastically in a very short time. In addition, SV hardware sharing considerations and limited available spectrum dictate that the system use phase modulation similar to the modulation used for the system's duplex channels.

The paging system timing hierarchy and the associated pager operational cycle allows the pager to employ a long sleep period of 172.3 seconds and still achieve the system synchronization necessary to receive messages during the block in which it is awake.

The pager is only required to track the superframe timing during its sleep period. The pager reacquires synchronization with the system at the beginning of each of its wake cycles. This is accomplished using the following operational sequence.

Search Mode

A pager exits its sleep cycle and enters a search mode either on power-up or one-half second before its active block is scheduled to begin. The one-half second guard time allows the pager to use a timing reference oscillator with a long term stability of 20 ppm.

The pager processes all bursts that it is capable of receiving and reads the Frame Header data. It realigns its internal timing according to the timing of the received bursts and the header information. If the Frame Header data indicates that the group is neither the Acquisition Group of the active block for the pager nor the fourth message group of the block preceding the active block, the pager resets its sleep timer (FIG. 3, 48) based on the difference between the Frame ID, Group ID, and Block ID and the Acquisition Group of its active block. The pager timer is set to activate the pager in the fourth message group of the block preceding the pager's active block. The pager then returns to the Sleep Mode.

If the received bursts are from an appropriate block and group, the pager monitors all signals it can detect until it receives an Acquisition Group burst from its active block. When it receives an Acquisition Group burst, it reads the Block Header Message 114.

If the Block Header Message indicates that the block is the pager's active block, the pager continues to process all of the bursts it can acquire.

On each acquired burst, the pager checks the Pager Address 131 in the Paging Data Fields. If the pager detects its address in a burst, it selects the schedule in that burst as the schedule it will monitor, and it reads and displays the message data. It also discontinues the acquisition process and enters the Track Mode (see below).

Unless the pager detects its address, it continues to process all bursts it can acquire over the forty-eight frame acquisition interval. The pager stores the data from the Block Header Messages of the three highest power bursts received from different beams. At the end of the acquisition interval, the pager generates a schedule to monitor by combining the schedules from bursts received at the best signal-to-noise ratios. It will be apparent that the schedules of more or fewer than three beams may be combined.

Track Mode

At the end of the Acquisition Group 83, the pager enters the Track Mode and remains in that mode through the remaining four groups. In the Track Mode it monitors the frames in the schedule it selected during the Acquisition Group.

In the Track Mode a pager only turns on its receiver during the frame times in the monitoring schedule. When not receiving, the pager enters a lower power quiescent mode. In a busy area it is possible, though highly unlikely, that all 240 frames in the block will be included in the monitoring schedule.

The pager corrects its internal timing based on received signal parameters throughout the acquisition and track modes.

After tracking through the active block, the pager returns to the Sleep Mode. It remains in the Sleep Mode until its internal timer indicates that the Acquisition Group of its active block in the next superframe is imminent.

Description of Flow Diagram

FIGS. 15–19 comprise a composite flow diagram of a method of operating an addressable call receiver, in accordance with the present invention.

The process begins in block 160.

Next, referring to box 161, a paging receiver exits its sleep cycle or Sleep Mode.

Next, in box 162, the receiver examines one of the transmitted Frame Headers.

Next, in decision box 163, a check is made whether the Frame Header contains this receiver's Block ID. If so, the method proceeds to box 164, where the receiver reads the Group ID, but, if not, the method proceeds to box 192 via line 165. In box 192, the receiver uses the Frame Header ID from this frame to determine when it should awake from its sleep cycle, and then it proceeds to box 194, where the receiver enters its sleep cycle.

From box 164, the method proceeds to decision box 166, where a check is made whether the frame is part of an Acquisition Group. If so, the method proceeds to box 167, but, if not, it proceeds via line 165 to box 192.

In box 167 the receiver monitors the Acquisition Group Then in box 168 the receiver monitors each frame in the block for its address. In decision box 170, if the receiver detects its address, the method proceeds to box 171, where the receiver reads and displays its message. In box 172 the receiver selects the schedule from the beam that transmitted the message as the one it will monitor.

If, in decision box 170, the receiver has not yet seen its address, the receiver monitors the Acquisition Group information (box 175) that is transmitted by one of the beams that it detects.

If, in decision box 177, the receiver detects a Block Header within the Acquisition Group information, the receiver reads and stores the corresponding beam visit information (box 178). Otherwise, the method proceeds via line 165 to box 192.

Proceeding to decision box 181, if the entire Acquisition Group has not yet been transmitted, the receiver keeps monitoring the Acquisition Group information transmitted by each additional beam, if any, which it sees (box 175), until the entire Acquisition Group has been transmitted.

Then, in box 184, the receiver selects the N beams (3 beams in a preferred embodiment) having at least one optimum characteristic (e.g. signal strength) and forms its monitoring schedule from the visit schedules contained in the block headers of the selected beams.

Referring to box 186, the receiver uses the stored monitoring schedule information to wake up during the remaining groups of this block to monitor only the frames contained in the schedule.

Referring to box 188, the receiver goes into Sleep Mode until just before the Acquisition Group of its block is transmitted. It then wakes up and synchronizes to the transmitted information of the group occurring just prior to its own Acquisition Group.

Finally, the method ends in block 196.

Conclusion

In summary, the present invention provides an improved message unit for use in a satellite-based, world-wide cellular messaging system. The message unit is capable of determining the optimum beam to monitor for its messages. In addition, it can synchronize very quickly to its message block. Further, it comprises a mechanism for achieving significant savings in its battery resource.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method executed by an addressable call receiver, said receiver having a sleep cycle and a wake cycle, said receiver being subjected to transmitted information in which a plurality of messages are grouped into a frame, a plurality of frames being grouped into a group, and a plurality of groups being grouped into a block, each of said frames having a frame header comprising frame, group, and block identification, predetermined frames each comprising a block header, said predetermined frames constituting an acquisition group, and said receiver storing an identification value identifying a block to which said receiver is assigned said method comprising the following steps:

(a) exiting said sleep cycle and examining one of said transmitted frame headers;
   (b) if said block identification of said frame header matches said identification value, proceeding to step (c), otherwise proceeding to step (d);
   (c) determining from said group identification whether said frame is part of an acquisition group;
      (i) if so, said receiver monitors said acquisition group and proceeds to step (e);
      (ii) if not, said receiver proceeds to step (d);
   (d) using said frame identification to determine when it should awake from said sleep cycle;
   (e) entering said sleep cycle.

2. The method recited in claim 1, wherein said receiver stores a unique receiver address, wherein one of said frames comprises said unique receiver address, and further comprising the following step:

(f) if step (c)(i) is satisfied, said receiver monitors each frame of said acquisition group for its address.

3. The method recited in claim 2, wherein said one frame further comprises a message, and further comprising the following step:

(g) if, in step (f) said receiver detects its address, said receiver reads said message, otherwise said receiver continues to monitor said block for its address.

4. The method recited in claim 3, wherein said information is transmitted by several different beams, and wherein said block header comprises beam visit information as to whether a particular beam will be used to transmit information to said receiver and, if so, when information will be transmitted using said particular beam, and further comprising the following steps:

(h) if said receiver detects its address and reads said message, said receiver selecting the beam that transmitted said message as the one it will monitor; and
   (i) said receiver storing said beam visit information corresponding to said block header.

5. The method recited in claim 4, and further comprising the following step:

(i) using said stored beam visit information, said receiver waking up, during the remaining groups of its block, to monitor only said frames in which the monitored beams are visited.

6. The method recited in claim 1, wherein said information is transmitted by N different beams, N being a positive integer, and wherein said block header comprises beam visit information as to whether a particular beam will be used to transmit information to said receiver and, if so, when information will be transmitted using said particular beam, and further comprising the following steps:

(f) said receiver monitoring said acquisition group information transmitted by a first beam;

(g) if said receiver detects a block header within said acquisition group information, said receiver reads and stores said beam visit information; and (h) repeating steps (f) and (g) until all of said acquisition group has been transmitted.

7. The method recited in claim 6, and further comprising the following step:

(i) said receiver selects the N beams having at least one optimum characteristic as the N beams it will monitor.

8. The method recited in claim 7, wherein said at least one optimum characteristic is signal strength.

9. The method recited in claim 7, wherein said at least one optimum characteristic is a signal propagation characteristic.

10. The method recited in claim 7, and further comprising the following step:

(j) using said stored beam visit information, said receiver waking up, during the remaining groups of its block, to monitor only said frames in which the monitored beams are visited.

11. The method recited in claim 10, and further comprising the following step:

(k) said receiver going to sleep until just before the acquisition group of its block is transmitted, then waking up and synchronizing to the transmitted information in the group just prior to said acquisition group.

12. An addressable call receiver, said receiver being subjected to transmitted information in which a plurality of messages are grouped into a frame, a plurality of frames being grouped into a group, and a plurality of groups being grouped into a block, each of said frames having a frame header comprising frame, group, and block identification, predetermined frames each comprising a block header, said predetermined frames constituting an acquisition group, said receiver comprising:

a memory for storing an identification value identifying a block to which said receiver is assigned;

a battery;

a receiver circuit coupled to said battery, said receiver circuit having a sleep cycle and a wake cycle;

a timer;

a processor coupled to said timer and to said receiver circuit;

said processor causing said receiver to enter said wake cycle and to examine one of said transmitted frame headers, and if said block identification of said frame header matches said identification value said processor causing said receiver to determine from said group identification whether said frame is part of an acquisition group, and if so, said receiver monitoring said acquisition group, but if said frame header does not contain said value or said frame is not part of an acquisition group, said receiver using said frame identification to determine when it should awake from said sleep cycle, and then entering said sleep cycle.

13. The receiver recited in claim 12, wherein said memory also stores a unique receiver address, wherein one of said frames comprises said unique receiver address, and wherein, if said frame is part of an acquisition group, said receiver monitors said block for its address.

14. The receiver recited in claim 13, wherein said one frame further comprises a message, and wherein if said receiver detects its address, said receiver reads said message, otherwise said receiver continues to monitor said block for its address.

15. The receiver recited in claim 14, wherein said information is transmitted by several different beams, and wherein said block header comprises beam visit information as to whether a particular beam will be used to transmit information to said receiver and, if so, when information will be transmitted using said particular beam, and wherein if said receiver detects its address and reads said message, said receiver selects the beam that transmitted said message as the one it will monitor, and said receiver stores said beam visit information corresponding to said block header.

16. The receiver recited in claim 15, and wherein, using said stored beam visit information, said receiver wakes up, during the remaining groups of its block, to monitor only said frames in which the monitored beams are visited.

17. The receiver recited in claim 12, wherein said information is transmitted by N different beams, N being a positive integer, and wherein said block header comprises beam visit information as to whether a particular beam will be used to transmit information to said receiver and, if so, when information will be transmitted using said particular beam, and wherein said receiver monitors said acquisition group information transmitted by a first beam, and if said receiver detects a block header within said acquisition group information, said receiver reads and stores said beam visit information; and said receiver repeats this process until all of said acquisition group has been transmitted.

18. The receiver recited in claim 17, wherein said receiver selects the N beams having at least one optimum characteristic as the N beams it will monitor.

19. The receiver recited in claim 18, wherein said at least one optimum characteristic is signal strength.

20. The receiver recited in claim 18, wherein said at least one optimum characteristic is a signal propagation characteristic.

21. The receiver recited in claim 18, wherein, using said stored beam visit information, said receiver wakes up during the remaining groups of its block to monitor only said frames in which the monitored beams are visited.

22. The receiver recited in claim 21, wherein said receiver goes to sleep until just before the acquisition group of its block is transmitted, then wakes up and synchronizers to the transmitted information in the group just prior to said acquisition group.

* * * * *